(12) United States Patent
Cortez

(10) Patent No.: US 7,258,130 B2
(45) Date of Patent: Aug. 21, 2007

(54) INTEGRATED JET FLUID LEVEL SHUTOFF SENSOR AND FUEL TANK VENT FOR VEHICLES

(75) Inventor: Jose Cortez, West Covina, CA (US)

(73) Assignee: Adel Wiggins Group, Los Angeles, CA (US)

(*) Notice: Subject to any disclaimer, the term of this patent is extended or adjusted under 35 U.S.C. 154(b) by 266 days.

(21) Appl. No.: 11/029,040

(22) Filed: Jan. 3, 2005

(65) Prior Publication Data

US 2005/0166966 A1   Aug. 4, 2005

Related U.S. Application Data

(63) Continuation-in-part of application No. 10/052,909, filed on Jan. 15, 2002, now Pat. No. 6,837,262.

(51) Int. Cl.
*F16K 21/18* (2006.01)

(52) U.S. Cl. .................. 137/393; 137/386; 141/198

(58) Field of Classification Search ........... 137/393, 137/386; 141/95, 198; 73/290 B, 302
See application file for complete search history.

(56) References Cited

U.S. PATENT DOCUMENTS

| | | | |
|---|---|---|---|
| 2,646,817 A | 7/1953 | Cox et al. | |
| 2,735,696 A | 2/1956 | Omon et al. | |
| 3,156,271 A | 11/1964 | Schnurrmann | |
| 3,174,503 A | 3/1965 | Absolon | |
| 3,269,404 A | 8/1966 | Lebow | |
| 3,335,746 A | 8/1967 | Lebow | |
| 3,363,641 A | 1/1968 | Mylander | |
| 3,561,465 A | 2/1971 | De Graaf | |
| 3,587,622 A | 6/1971 | Hardison | |
| 3,590,886 A | 7/1971 | Judd | |
| 3,662,793 A | 5/1972 | Calisher et al. | |
| 3,674,061 A | 7/1972 | Calisher et al. | |
| 3,703,907 A | 11/1972 | Richards | |
| 4,006,762 A | 2/1977 | Badger | |
| 4,024,887 A | 5/1977 | McGregor | |
| 4,161,188 A | 7/1979 | Jorgensen | |
| 4,191,208 A | 3/1980 | Mylander | |
| 4,211,249 A * | 7/1980 | Richards ................. | 137/393 |
| 4,312,373 A | 1/1982 | Tilling et al. | |
| 4,327,770 A | 5/1982 | Brown et al. | |
| 4,345,618 A * | 8/1982 | Altman et al. ........... | 137/393 |
| 4,484,601 A * | 11/1984 | Campau .................. | 137/805 |
| 4,515,178 A | 5/1985 | Campau | |
| 4,919,174 A | 4/1990 | Warland | |
| 5,285,812 A | 2/1994 | Morales | |
| 6,009,901 A | 1/2000 | Roberts | |
| 6,354,564 B1 | 3/2002 | Van Scyoc et al. | |

OTHER PUBLICATIONS

Adel Wiggins, Inc., Wiggins Service systems brochure, 2003, sheet 2, www.adelwiggins.com.*

* cited by examiner

Primary Examiner—Eric Keasel
Assistant Examiner—Craig Price
(74) Attorney, Agent, or Firm—Fulwider Patton LLP

(57) ABSTRACT

The integrated jet fluid level shutoff sensor vent assembly is designed for use in conjunction with a non-pressurizing tank fast fill system, and to support automatic shutoff fast fill refueling of vehicles. The integrated jet fluid level shutoff sensor vent assembly is mounted to a fuel tank and exposed inside the fuel tank for sensing a predetermined level of fuel within the fuel tank and allowing fully vented refueling.

15 Claims, 4 Drawing Sheets

INTEGRATED JET FLUID LEVEL SHUTOFF SENSOR AND FUEL TANK VENT FOR VEHICLES

RELATED APPLICATIONS

This is a continuation-in-part of Ser. No. 10/052,909 filed Jan. 15, 2002 now U.S. Pat. No. 6,837,262.

BACKGROUND OF THE INVENTION

This invention relates generally to an integrated refueling shutoff sensor and fuel tank vent assembly for automatic shutoff fast fill refueling of vehicles without pressurizing the fuel tank, and more specifically relates to an integrated jet fluid level shutoff sensor and fuel tank vent assembly used in conjunction with a dual valve receiver designed to support automatic shutoff fast fill refueling of vehicles without pressurizing the fuel tank.

Currently, refueling receivers work in conjunction with fast fill automatic shutoff nozzles that require a tank back pressure build up in order for them to shutoff. In order to use a pressurized refueling system, the fuel tanks have to be structurally designed to withstand internal pressures of up to 10 psi. This current system of automatic shutoff fast fill refueling therefore can not be utilized in machinery with fuel tanks of a lighter construction that can benefit from fast fill refueling.

Currently available refueling systems that predominantly rely on a back pressure generated within the vehicle's fuel tank for operation of an automatic shutoff nozzle also require a separate fuel tank vent or ventilation system to allow for the breathing of the fuel tank during refueling and/or vehicle operation. Maintaining a vehicle's fuel tank fully vented during vehicle refueling meets safety and environmental concerns, by minimizing tank over-pressurization and tank overflow that is commonly associated with conventional pressurized refueling systems. Separate installation of a fuel level sensor and a vent or ventilation system is time consuming and costly. It would therefore be desirable to provide an integrated jet fluid level shutoff sensor and fuel tank vent assembly, in which the fuel tank vent is fully integrated with the jet fluid level shutoff sensor, to improve ease of use and to facilitate installation and maintenance of a fuel tank vent or ventilation system, for use in conjunction with a non-pressurizing fuel tank receiver that would allow for full venting during refueling in conjunction with use of an automatic shutoff refueling nozzle. The present invention addresses these and other concerns.

SUMMARY OF THE INVENTION

The present invention is directed to an integrated jet fluid level shutoff sensor and fuel tank vent assembly for use in conjunction with a non-pressurizing tank fast fill system, and is designed to support automatic shutoff fast fill refueling of vehicles. The integrated jet fluid level shutoff sensor and fuel tank vent assembly reduces risks of leakage associated with separate mounting of a fuel level sensor and a fuel tank vent or ventilation system, and improves ease of use and facilitates installation and maintenance of a fuel tank level sensor and fuel tank vent or ventilation system, allowing for full venting during refueling of vehicles with a non-pressurizing fuel tank receiver in conjunction with an automatic shutoff refueling nozzle.

The integrated jet fluid level shutoff sensor and fuel tank vent assembly of the invention is adapted to be mounted to a vehicle fuel tank to be exposed inside the fuel tank for sensing a predetermined level of fuel within the fuel tank, minimizing overfilling and underfilling of the fuel tank. The integrated jet fluid level shutoff sensor vent assembly is fully vented to prevent the risk of pressure build up that otherwise may occur during fast refueling. The integrated jet fluid level shutoff sensor vent assembly provides a combination of a jet fluid level shutoff sensor and a fuel tank vent assembly fully integrated with the jet fluid level shutoff sensor, and the integrated jet fluid level shutoff sensor vent assembly can be used in conjunction with a non-pressurizing fuel tank receiver to allow for full venting during refueling of the fuel tank with an automatic shutoff refueling nozzle. The integrated jet fluid level shutoff sensor vent assembly can readily be used for modification of existing non-venting, non-pressurizing fuel tanks that can benefit from fast fill refueling.

In one aspect, the invention provides for an integrated jet fluid level shutoff sensor and fuel tank vent assembly for sensing a predetermined level of fuel within a fuel tank while fully venting the fuel tank. The assembly includes a sensor base section with a sensor inlet for receiving fuel from a fuel supply, and a sensor outlet for returning fuel from the sensor, and a fuel channel connected between the sensor inlet and sensor outlet.

The fuel channel includes an outlet orifice and an inlet orifice spaced apart by a cutout section, with the outlet orifice aligned with the inlet orifice to conduct a stream of fuel across the cutout section to the inlet orifice. The cutout section exposes the stream of fuel to the contents of the fuel tank, whereby fuel in the fuel tank reaching the cutout section will interrupt the stream of fuel, thereby interrupting flow of fuel through the jet sensor.

One or more interior vent channels are provided in the sensor base section for communication with the interior of the fuel tank, and one or more vent outlet ports are provided in communication with the one or more interior vent channels to fully vent the fuel tank. In one aspect, the base section includes a jet sensor cover having a wall, the one or more vent outlet ports formed in the wall. The one or more vent outlet ports may be covered by a filter to maintain the fuel tank free from contamination.

Other features and advantages of the present invention will become apparent from the following detailed description taken in conjunction with the accompanying drawings which illustrate, by way of example, the principles of the invention.

DETAILED DESCRIPTION OF THE PREFERRED EMBODIMENTS

Current automatic shutoff fast fill refueling systems can not be utilized in machinery with fuel tanks of a lighter construction that can benefit from fast fill refueling. Currently available refueling systems utilizing fuel tank back pressure for operation of an automatic nozzle shutoff typically require a fuel tank vent or ventilation system to allow for the breathing of the fuel tank during refueling and/or vehicle operation. For automatic refueling shutoff systems utilizing an internal fuel level sensor mounted to the fuel tank, a separate fuel tank vent or ventilation system mounted at an additional port in the fuel tank wall is also typically required, increasing the risk of fuel tank leaks. The separate mounting of the fuel level sensor and vent or ventilation system in a protected or otherwise crowded area can increase the difficulty of maintaining such mountings and accessing the fuel tank vent or ventilation system, such as for changing of ventilation filters. In addition, separate installation of a fuel level sensor and a vent or ventilation system is time consuming and costly.

The present invention accordingly provides for an integrated jet fluid level shutoff sensor and fuel tank vent assembly, to reduce risks of fuel leakage, to improve ease of use and facilitate installation and maintenance of a fuel tank level sensor and vent or ventilation system, and to allow for full venting during refueling of vehicles with a non-pressurizing fuel tank receiver in conjunction with an automatic shutoff refueling nozzle.

Figure 1:
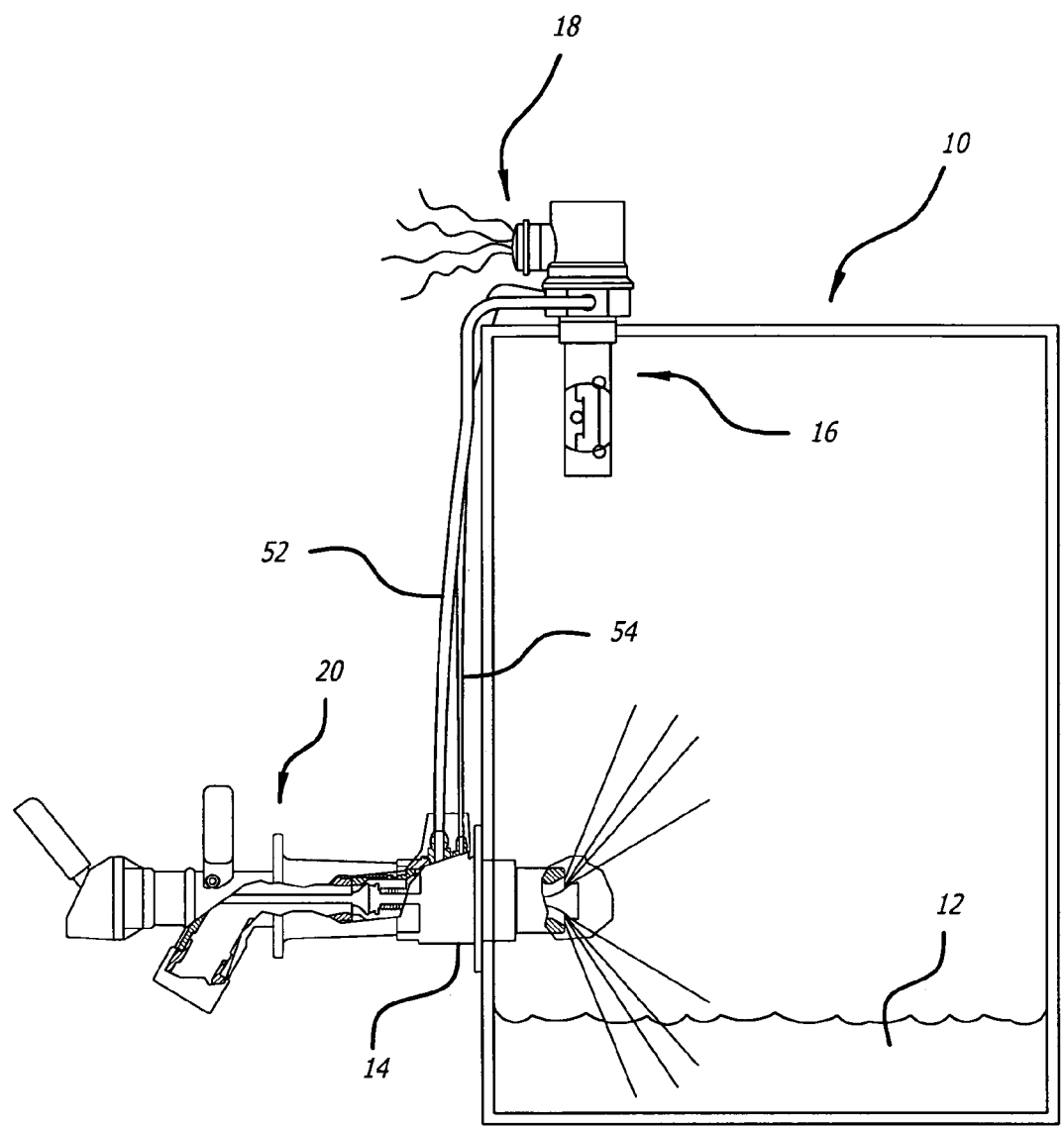
FIG. 1 is a partial cross-sectional elevational view of a fuel tank with a non-pressurizing receiver, and an integrated jet fluid level shutoff sensor and fuel tank vent assembly of the invention, showing a partial cutaway view of the cutout section of the sensor.

An integrated jet fluid level shutoff sensor and fuel tank vent assembly according to the invention for vehicles, such as large mining or construction vehicles or off-road vehicles, for example, can be seen in FIG. 1. A fuel tank is generally designated 10, and the fuel inside the tank is designated 12. There is a receiver 14, connected in communication with the fuel tank, and an integrated jet fluid level shutoff sensor vent assembly 16 connected to the receiver and exposed inside the fuel tank to detect the level of fuel in the tank. The integrated jet fluid level shutoff sensor vent assembly also includes at least one vent outlet port 18, in communication with the fuel tank to vent the fuel tank and to prevent any air pressure build up inside the tank, as will be further explained hereinbelow.

Figure 4:
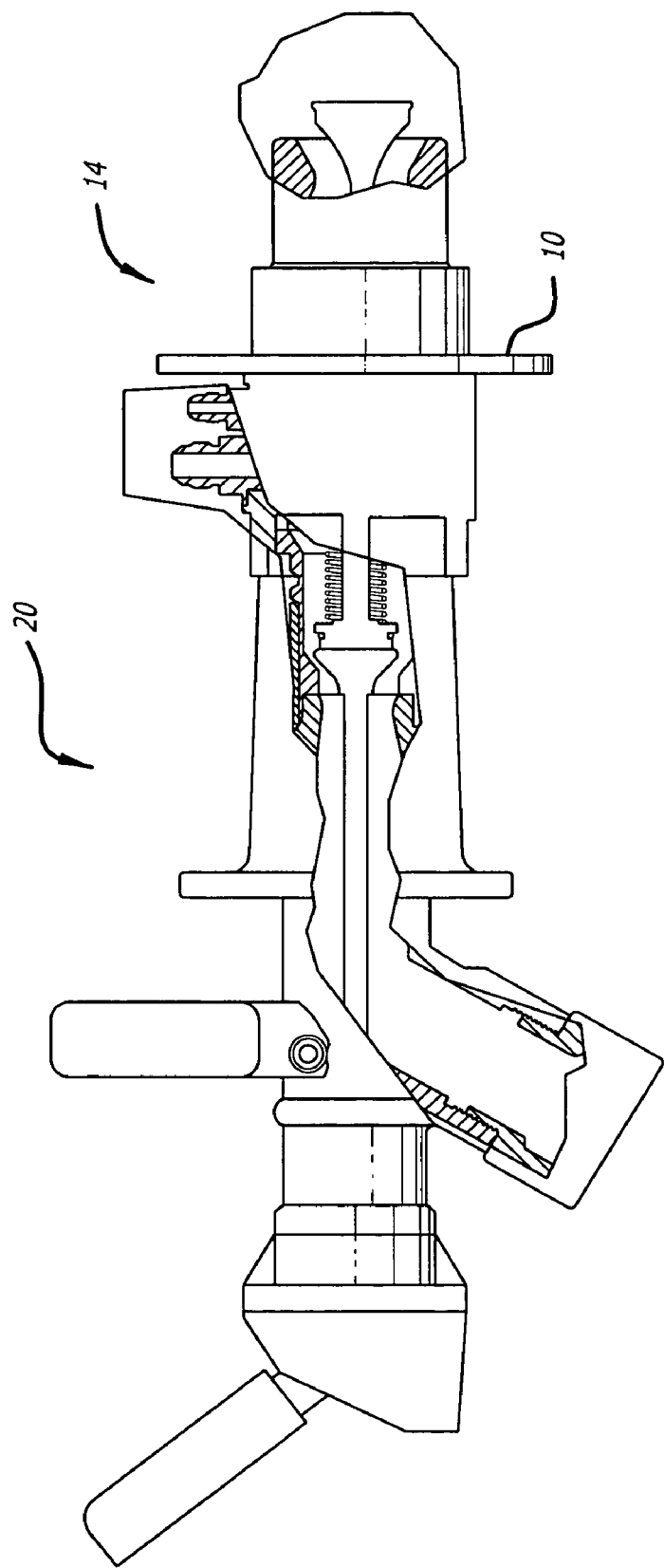
FIG. 4 is a partial sectional view of the non-pressurizing receiver of FIGS. 1-3 in combination with an automatic shutoff nozzle.

A refueling nozzle 20 is also seen in FIGS. 1 and 4, the nozzle is in communication with a fuel source and forms a removable connection with the non-pressurizing receiver. In this embodiment, the refueling nozzle is an automatic shutoff nozzle, such as the Adel Wiggins ZZ9A1 refueling nozzle, which automatically shuts off when pressure inside the receiver and nozzle reaches a threshold level.

Figure 2:
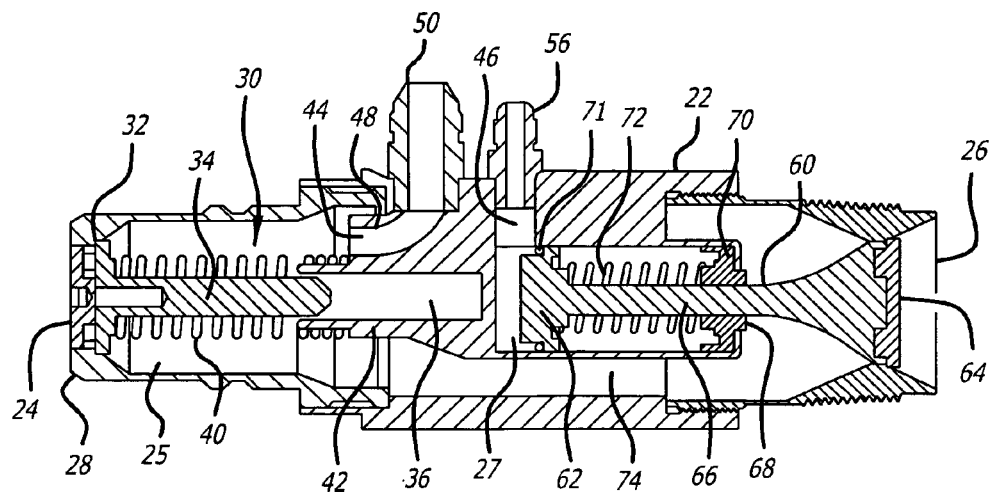
FIG. 2 is cross-sectional elevational view of a non-pressurizing receiver illustrated in FIG. 1 in the closed position.
Figure 3:
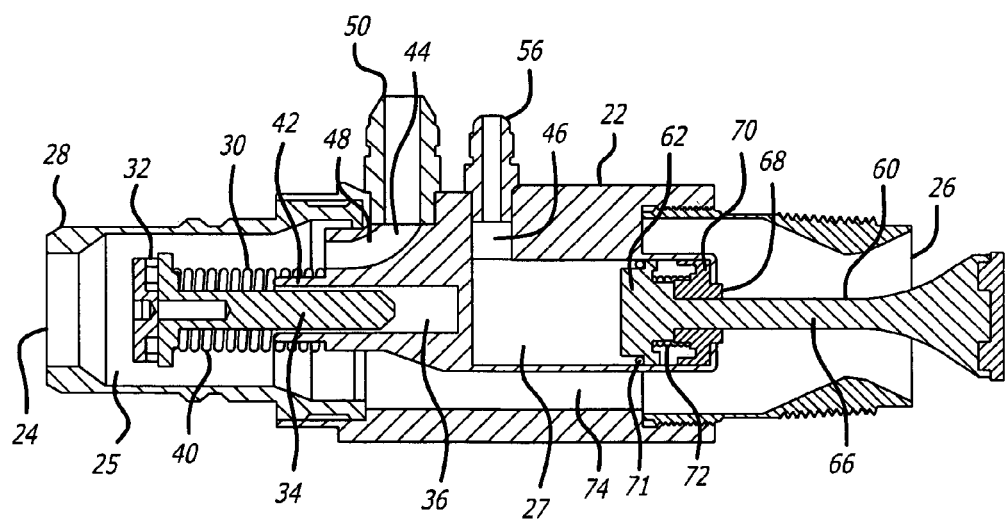
FIG. 3 is a cross-sectional elevational view of the dual valve non-pressurizing receiver illustrated in FIG. 1 in the open position.

As best seen in FIGS. 2 and 3, an embodiment is shown where the non-pressurizing receiver is a dual valve receiver having a receiver body 22 with an inlet 24 and an outlet 26, and a first chamber 25 and a second chamber 27. There is a nipple interface 28 at the inlet 24 which connects to the refueling nozzle. A first valve 30 is disposed inside the receiver body, being biased toward a closed position, sealing the inlet, and is movable between the closed position and an open position allowing fuel to flow into the receiver body. The first valve has a nipple poppet 32 which seals the inlet, and a post 34 in connection with the nipple poppet that is slidingly mated in a recess 36. The first valve is biased with a first spring 40 that encircles a portion of the post, and is fitted against the nipple poppet at one end of the spring and a wall 42 of the recess at the other end.

Also located in the receiver body is a sensor fuel path 44 and a return fuel path 46, both being in communication with the integrated jet fluid level shutoff sensor vent assembly. In this embodiment, the sensor fuel path includes an integrated Pitot tube 48 that leads to a jet pick-up fitting 50 that is connected to the receiver body. The jet pick-up fitting is connected to a sensor hose 52 (seen in FIG. 1) which leads fuel to the integrated jet fluid level shutoff sensor vent assembly. Once the fuel is channeled through the integrated jet fluid level shutoff sensor vent assembly, a return hose 54 (seen in FIG. 1) leads the fuel from the integrated jet fluid level shutoff sensor vent assembly back to the receiver. The return hose is connected to the receiver body with a jet return fitting 56 which is part of the return fuel path. The return fuel path is in communication with the second chamber disposed inside the receiver body. The diameter of the jet pick-up fitting and the sensor hose can be manufactured to be larger than the diameter of the jet return fitting and return hose, in order to facilitate and sustain the pressure increase in the second chamber when fuel follows the sensor fuel path and the return fuel path. This is best shown in FIGS. 2 and 3.

The integrated Pitot tube is the component that facilitates the pressure build up to control the opening and closing of the receiver. First, the Pitot tube helps direct the incoming flow through the jet pick-up fitting to initiate pressurization of the second chamber. In addition to directing the fuel flow, the Pitot tube also captures the dynamic pressure from the incoming fuel, which when added to the static pressure, helps maintain the pressure in the second chamber when the second valve of the receiver is opened, as shown in FIG. 3.

The receiver also includes a second valve or piston shuttle 60 having a first end 62 and a second end 64, with the ends connected by a shaft 66. The first end 62 is disposed inside the second chamber, and the shaft is fitted through an opening 68 of the second chamber. The second chamber has a guide 70 located around the opening 68 to guide the shaft of the second valve 60 as it moves between open and closed positions. Attached to the first end 62 of the second valve 60 is a seal 71 which prevents fuel from escaping the inside the second chamber, and therefore serves to maintain the pressure the fuel creates inside the second chamber. In one embodiment, the seal is a spring energized seal, that reduces friction to facilitate movement of the second valve. As seen in FIG. 2, the second valve is biased in a closed position by a second spring 72, with the second end 64 sealing the outlet of the receiver body. The second spring is affixed to the first end of the second valve and to the guide inside the second chamber. The second valve is the flow control mechanism of the receiver, and is moveable between the closed position and an open position. The open position is shown in FIG. 3, and it allows fuel to enter the fuel tank through a main fuel path 74 which is in communication with the inlet and outlet.

When the second chamber is pressurized, the pressurized fuel displaces the second valve from its initial closed position to the open position allowing fuel to fill the tank. As the fuel within the fuel tank begins to rise, it reaches the level where the fuel flow through the integrated jet fluid level shutoff sensor vent assembly is interrupted. Once the interruption occurs, the pressure build up within the return fuel path and second chamber decreases, and the second valve begins to close once the second spring overcomes the pressure in the second chamber.

Figure 5:
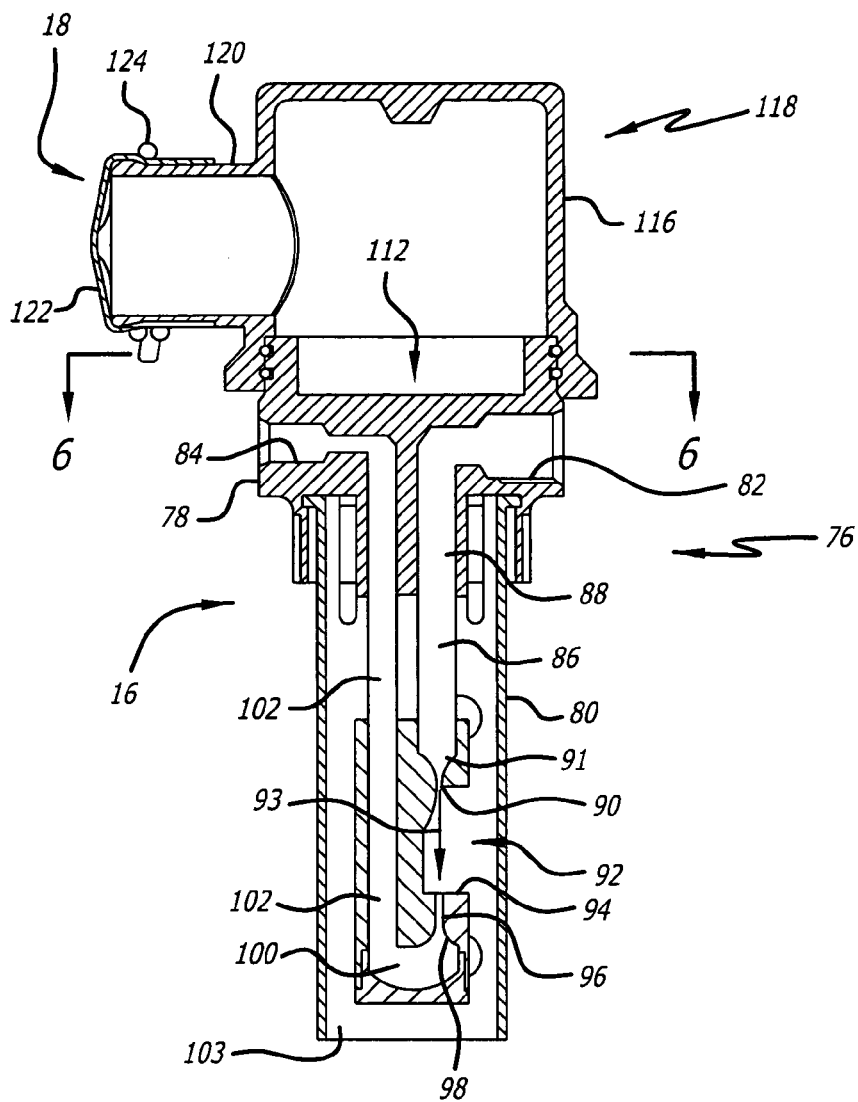
FIG. 5 is a cross-sectional elevational view of the sensor.
Figure 6:
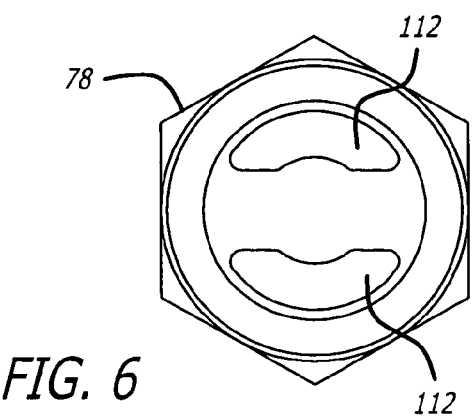
FIG. 6 is a cross-sectional view of the sensor vent taken along line 6-6 of FIG. 5, with the jet sensor cover removed.

Now referring to FIGS. 5 and 6, the integrated jet fluid level shutoff sensor vent assembly has a sensor body 76 with a base section 78 connected to a cutout section 92 via jet tubes 86 and 102. In this embodiment, the base section includes a sensor inlet 82 and a sensor outlet 84 disposed at opposite ends of the base section, although positioning of the inlet and outlet may vary. To facilitate an increased pressure flow of fuel, the diameter of the sensor inlet is larger than the diameter of the sensor outlet. The sensor inlet may include a flared or flareless mating fitting of thread size 0.750-16 UNJ to connect the sensor hose, and the sensor outlet may include a flared or flareless mating fitting of thread size 0.4375-20 UNJF to connect the return hose. The fittings of the sensor inlet and outlet may vary in size, and additional fittings may be added to the sensor inlet and outlet in order to direct the connecting sensor hose and return hose in a specific direction.

As best seen in the cross-sectional view of FIG. 5, a first jet tube or fuel channel 86 is formed in the integrated jet fluid level shutoff sensor vent assembly, and has a first section 88 which receives fuel from the sensor inlet, and directs the fuel to an outlet orifice 90. There is a tapered section 91 which funnels fuel from the first section 88 out through the outlet orifice, where a stream of fuel 93 then shoots across a cutout section 92 and into an inlet orifice 94. The inlet orifice leads the fuel first into a narrow path 96 that widens at a tapered section 98, and then the fuel enters a transition section 100. At the transition section the fuel completes a U-turn and enters a second jet tube or exit fuel channel 102, and flows out through the sensor outlet. The jet protective shield 80 is open at its lower end 103 to the contents of the fuel tank, and the cutout section disposed in the jet protective shield exposes the stream of fuel between the outlet orifice and the inlet orifice to the contents of the fuel tank. The cutout section in this embodiment is about 1.13 inches in length, and 0.89 inches in width, which is also the width of the jet protective shield.

The integrated jet fluid level shutoff sensor vent assembly operates to pressurize the second chamber of the dual valve receiver when fuel is below the predetermined level of fuel within the fuel tank, and to not pressurize the second chamber when fuel is at or above the predetermined level of fuel within the fuel tank. Once the fuel level in the fuel tank reaches the cutout section, the stream of fuel from the outlet orifice to the inlet orifice will be interrupted and submerged by the fuel in the tank, thereby stopping the transmission of velocity head or pressure to the narrow path 96 and transition section 100. There will then be a pressure decrease in the second path 102, the return hose, and the second chamber, causing the second valve of the dual valve receiver to close off the fuel flow into the tank. The interruption of the fuel stream followed by the decrease of pressure in the second chamber results in accurate refueling of the tank without underfilling or overfilling of the tank. While the cutout section is the detection means in this embodiment, other means to interrupt the fuel flow in the fuel channel have been contemplated, and include, but are not limited to, the use of a flotation device to interrupt the flow through the fuel channel and the use of electrical means to disrupt the fuel flow.

During vehicle refueling, the automatic refueling nozzle is connected to the nipple interface of the receiver. The nozzle is then cocked open, to open the nipple poppet inside the receiver by overcoming the biasing force of the first spring 40. With the inlet open, fuel enters the receiver, and a portion of the fuel is directed up through the sensor fuel path by means of the integrated Pitot tube and jet pick up fitting, where the fuel flows through the sensor hose leading to the integrated jet fluid level shutoff sensor vent assembly. The fuel is then channeled through the integrated jet fluid level shutoff sensor vent assembly as described above, and returned through the return hose and jet return fitting into the second chamber. As fuel flows into the second chamber, the second chamber becomes pressurized, causing the second valve to open. When the second chamber is completely pressurized, the second valve opens completely allowing fuel to enter the fuel tank via the main fuel path 74. At this point, any further flow through the return hose and jet return fitting ceases, and flow across the cutout section from the outlet orifice to the inlet orifice helps maintain the pressure within the jet return hose and second chamber, thus keeping the receiver open. Fuel enters the fuel tank as long as the second valve remains open. Once the fuel level reaches the integrated jet fluid level shutoff sensor vent assembly, the rising fuel submerges and interrupts the fuel flow across the cutout section of the integrated jet fluid level shutoff sensor vent assembly, decreasing the pressure in the second chamber, and commencing the closing of the second valve. As the second valve closes, back pressure builds up within the receiver body and nozzle interface, and fuel flow stops when the shutoff pressure is reached on the automatic shutoff-refueling nozzle. The sensor in the fuel tank then does not sense any pressure during the refuel and shutoff process as the pressure is only sensed within the receiver and nozzle. Once the automatic shutoff-refueling nozzle closes, it cannot be reopened completely due to the interruption of the stream of fuel of the integrated jet fluid level shutoff sensor vent assembly by the fuel level. Since the automatic shutoff-refueling nozzle is prevented from re-opening, fuel tank over-fill is also prevented.

There is thus no build up of any undesired pressure in the fuel tank, since the integrated jet fluid level shutoff sensor vent assembly is fully vented. The vent system is integrally formed in the integrated jet fluid level shutoff sensor vent assembly, as is shown in FIGS. 5 and 6. Interior vent channels or sections 112 extend through the base section of the integrated jet fluid level shutoff sensor vent assembly and connect the inside of the tank to the outside environment. A jet sensor cover 118 is mounted on the base section of the integrated jet fluid level shutoff sensor vent assembly to keep any contamination from entering the fuel tank. The wall 116 of the jet sensor cover includes at least one vent outlet port such as port 120, which may be covered by a filter or screen 122 secured over the vent outlet port, typically by a coil spring clip 124 or the like. The vent outlet port may also be connected to a vapor trap (not shown) for recovery of vented fuel, for example.

It should therefore be appreciated that the present invention provides for an integrated jet fluid level shutoff sensor and fuel tank vent assembly for a refueling system, wherein the integrated jet fluid level shutoff sensor vent assembly is mounted to a fuel tank and exposed inside the fuel tank for sensing and controlling a level of fuel within the fuel tank, to minimize overfilling and underfilling of the fuel tank. The full venting of the integrated jet fluid level shutoff sensor vent assembly avoids the risks associated with pressure build up within the fuel tank that can otherwise occur during fast fill refueling. The integrated jet fluid level shutoff sensor vent assembly fully integrates a jet fluid level shutoff sensor with a fuel tank vent assembly, allowing the integrated jet fluid level shutoff sensor vent assembly to be used in conjunction with a non-pressurizing fuel tank receiver to allow for fully vented refueling of the fuel tank with an automatic shutoff refueling nozzle, and allowing the integrated jet fluid level shutoff sensor vent assembly to be readily used for modification of existing non-venting, non-pressurizing fuel tanks that can benefit from fast fill refueling. The integrated jet-fluid level shutoff sensor and fuel tank vent assembly reduces risks of fuel leakage associated with separate mounting of a fuel level sensor and a fuel tank vent or ventilation system, and improves ease of use and facilitates installation and maintenance of a fuel tank level sensor and fuel tank vent or ventilation system.

While a particular form of the invention has been illustrated and described it will also be apparent that various modifications can be made without departing from the spirit and scope of the invention. Accordingly, it is not intended that the invention be limited except as by the appended claims.

What is claimed is:

1. An integrated jet fluid level shutoff sensor and fuel tank vent assembly for sensing a predetermined level of fuel within a fuel tank while fully venting the fuel tank, comprising:
   a sensor base section including a sensor inlet for receiving fuel from a fuel supply and a sensor outlet for returning fuel from the sensor;
   a fuel channel connected in communication between the sensor inlet and sensor outlet, the fuel channel including an outlet orifice and an inlet orifice spaced apart by a cutout section, the outlet orifice being aligned with the inlet orifice to conduct a stream of fuel across the cutout section to the inlet orifice, the cutout section exposing the stream of fuel between the outlet orifice and the inlet orifice to the contents of the fuel tank, whereby fuel in the fuel tank reaching the cutout section will interrupt the stream of fuel, thereby interrupting flow of fuel through the jet sensor;
   a protective shield having an upper end and a lower end, said upper end mounted to said sensor base section, said protective shield surrounding said cutout section, and said lower end being open to the contents of the fuel tank to permit fuel in the fuel tank to reach the cutout section through said lower end;
   at least one interior vent channel in the sensor base section for communication with the interior of the fuel tank; and
   at least one vent outlet port in communication with said at least one interior vent channel to fully vent the fuel tank.

2. The integrated jet fluid level shutoff sensor and fuel tank vent assembly of claim 1, wherein said base section includes a jet sensor cover having a wall, and said at least one vent outlet port is formed in the wall.

3. The integrated jet fluid level shutoff sensor and fuel tank vent assembly of claim 2, wherein said at least one vent outlet port is covered by a filter to maintain the fuel tank free from contamination.

4. The integrated jet fluid level shutoff sensor and fuel tank vent assembly of claim 1, wherein said sensor inlet has a diameter that is larger than a corresponding diameter of the sensor outlet.

5. The integrated jet fluid level shutoff sensor and fuel tank vent assembly of claim 1, wherein the fuel channel comprises a first section connected in communication with the sensor inlet for receiving fuel from the sensor inlet and for directing the stream of the fuel to the outlet orifice across the cutout section to the inlet orifice.

6. The integrated jet fluid level shutoff sensor and fuel tank vent assembly of claim 5, wherein said first section of the fuel channel includes a tapered section which funnels fuel from the first section to the outlet orifice.

7. The integrated jet fluid level shutoff sensor and fuel tank vent assembly of claim 5, wherein the fuel channel comprises a second section connected in communication with the sensor outlet, the inlet orifice being connected in communication with the second section to conduct fuel to flow out through the sensor outlet.

8. An integrated sensor vent assembly in combination with a refueling system for a fuel tank including a receiver removably connected to an automatic shutoff refueling nozzle, the integrated sensor vent assembly being operatively connected to the fuel tank for sensing a predetermined level of fuel within the fuel tank, the integrated sensor vent assembly being connected to the receiver, the integrated sensor vent assembly comprising:
   a sensor base section including a sensor inlet for receiving fuel from the receiver, a sensor outlet for returning fuel to the receiver, and at least one vent outlet port;
   a fuel channel connected in communication between the sensor inlet and sensor outlet, the fuel channel including an outlet orifice and an inlet orifice spaced apart by a cutout section, the outlet orifice being aligned with the inlet orifice to conduct a stream of fuel across the cutout section to the inlet orifice, the cutout section exposing the stream of fuel between the outlet orifice and the inlet orifice to the contents of the fuel tank, whereby fuel in the fuel tank reaching the cutout section will interrupt the stream of fuel, thereby interrupting flow of fuel through the integrated sensor vent assembly, and whereby fuel is permitted to flow through the receiver when the level of fuel in the fuel tank is below the integrated sensor vent assembly, and fuel is not permitted to flow through the receiver when fuel in the fuel tank is at or above the integrated sensor vent assembly;
   a protective shield having an upper end and a lower end, said upper end mounted to said sensor base section, said protective shield surrounding said cutout section, and said lower end being open to the contents of the fuel tank to permit fuel in the fuel tank to reach the cutout section through said lower end; and
   the sensor base section including at least one interior vent channel communicating between the fuel tank and said at least one vent outlet port, whereby the fuel tank is fully vented.

9. The combination of claim 8, wherein said base section includes a sensor cover having a wall forming an upper vent chamber, said at least one interior vent channel being in communication with the upper vent chamber, said at least one vent outlet port being formed in the wall.

10. The combination of claim 9, wherein said at least one vent outlet port is covered by a filter to maintain the fuel tank free from contamination.

11. The combination of claim 8, wherein said sensor inlet has a diameter that is larger than a corresponding diameter of the sensor outlet.

12. The combination of claim 8, wherein the fuel channel comprises a first section connected in communication with the sensor inlet for receiving fuel from the sensor inlet and for directing the stream of the fuel to the outlet orifice across the cutout section to the inlet orifice.

13. The combination of claim 12, wherein said first section of the fuel channel includes a tapered section which funnels fuel from the first section to the outlet orifice.

14. The combination of claim 12, wherein the fuel channel comprises a second section connected in communication with the sensor outlet, the inlet orifice being connected in communication with the second section to conduct fuel to flow out through the sensor outlet.

15. In a refueling system including a fuel tank, a non-pressurizing receiver connected in communication with the fuel tank, the receiver adapted to receive a fuel nozzle and to control a flow of fuel from the fuel nozzle through the receiver into the fuel tank, and a sensor means operatively connected to the fuel tank for sensing a predetermined level of fuel within the fuel tank, the sensor means being connected in communication with the receiver, the sensor means being operative to allow the flow of fuel through the receiver when the level of fuel in the fuel tank is below the sensor means, and the sensor means being operative to shut off the flow of fuel through the receiver when the level of fuel is at or above the sensor means, the improvement in the refueling system comprising:

a protective shield having an upper end and a lower end, said upper end mounted to and surrounding said sensor means, said lower end being open to contents of the fuel tank to permit fuel in the fuel tank to reach the sensor means through said lower end; and a vent formed integrally with the sensor means providing for full venting of the fuel tank during fast fill refueling.

* * * * *